May 29, 1945.  S. J. HARRIS  2,376,872
GLASS TREATMENT PROCESSES
Filed Oct. 20, 1942
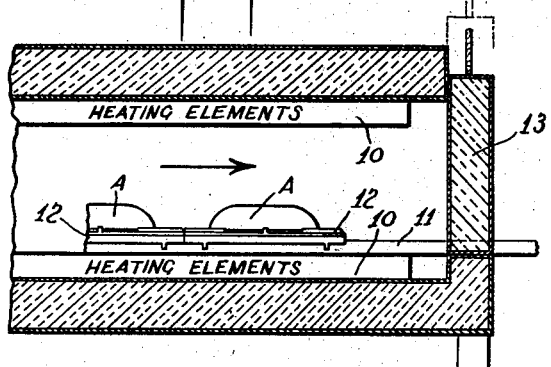
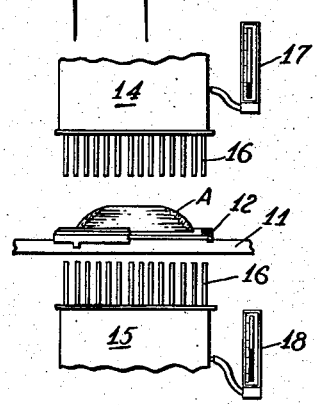
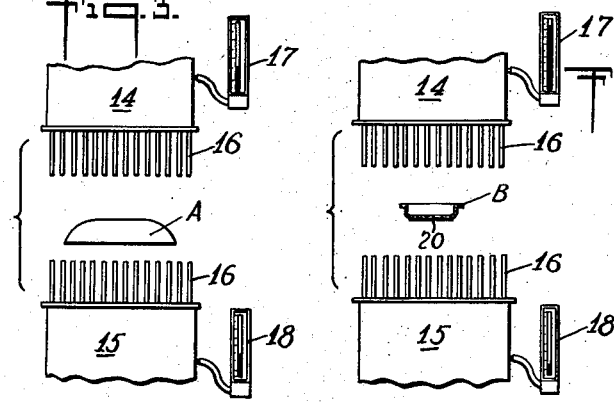
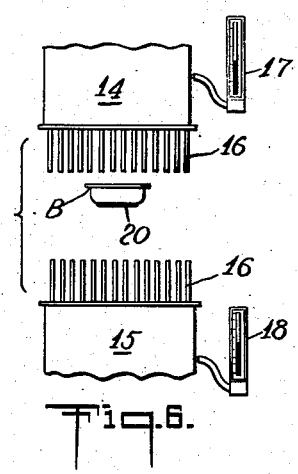
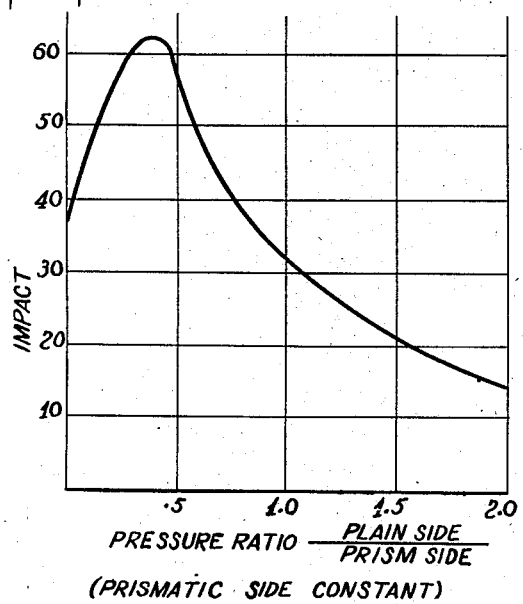
INVENTOR.
SAMUEL J. HARRIS
BY
ATTORNEY Patented May 29, 1945

2,376,872

UNITED STATES PATENT OFFICE 2,376,872

GLASS TREATMENT PROCESS

Samuel J. Harris, Newark, Ohio, assignor to Holophane Company, Inc., New York, N. Y., a corporation of Delaware Application October 20, 1942, Serial No. 462,717

7 Claims. (Cl. 49—89)

The present invention relates to glass treatment processes, and is more particularly directed toward the tempering of glass articles such as prismatic reflectors, refractors and diffusers, and enameled glass articles.

Application of the usual processes of tempering smooth glass sheets and the like by blowing air on to the opposite sides of the same has been found to bring about irregular and uncertain results when applied to articles with unlike natural cooling rates in free air, and in such cases the glass was not uniformly tempered to the high degree desired.

The present invention contemplates methods by which it is possible to achieve the uniform production of such glass articles with a very high degree of tempering.

The present invention is particularly applicable to articles wherein the two sides of the article are not alike, such as results from the placing of prismatic ribs and the like on one side of the article opposite a smooth or relatively smooth face, or such as results from the application of an enamel, particularly a dark colored enamel, to one face of the glass article.

Articles, of the type just referred to, have either a greater superficial area or a less natural cooling rate which brings about a lesser capacity for effecting heat transfer on the prismatic, or the unenameled face, than on the opposite face.

The present invention contemplates the application of the cooling medium to the opposite faces of the article in such a way that a lesser, but adequate, amount of cooling medium, or cooling force, is applied to the relatively smooth face or enameled face than to the opposite prismatic, or to the unenameled surface.

The accompanying drawing shows, for purposes of illustrating the present invention, several forms of apparatus for carrying out the method, it being understood that the drawing is illustrative of the invention rather than limiting the same.

In the drawing:

Figure 1 is a diagrammatic sectional view through a heating furnace;

Figure 2 is a more or less diagrammatic view illustrating the application of cooling medium under greater pressure on the prismatic side of the article than on the opposite side;

Figure 3 is a view similar to Figure 2 illustrating the variation of cooling force by so disposing the parts as to place the article closer to one of the sources of air than the other;

Figure 4 is a diagram or plot showing the variation in impact with change in pressure ratio in the arrangement shown in Figure 2; and Figures 5 and 6 are views similar to Figures 2 and 3, respectively, illustrating the treatment of an article which is enameled on the lower surface.

A conventional heat treating furnace is illustrated in Figure 1. It has electrical heating elements 10, 10 and a track 11 adapted to support carriers 12, 12, which in turn support the article A to be heat treated. The furnace is operated so that the articles are heated approximately to the softening point of the glass, whereupon they are withdrawn through a door such as indicated at 13. The article A illustrated in Figures 1, 2 and 3 and shown more fully in Patents 2,329,557 of September 14, 1943, or 2,352,801 of July 4, 1944, is a dome-shaped, pressed glass lens with prisms on the lower surface as the article is illustrated in the drawing, and having an upper smooth surface.

When the carrier 12 with the article on it is withdrawn from the furnace it is immediately passed between two air heads 14 and 15 connected to suitable sources of air under pressure and carrying a large number of nozzles 16, 16 in the form of small tubes. The air heads 14 and 15 are connected to pressure gauges, such as indicated at 17 and 18. The pressure gauge 18 for the air head 15 indicates that a substantially higher pressure is present than on the gauge 17 for the air head 14.

As the air heads are preferably made alike, a greater amount of air will pass out through the nozzles connected with the lower air head and much more air will be brought against the lower surface of the article A than is brought against the upper surface. By supplying the air head with long tubes, such as illustrated, there is ample opportunity for the air to escape from the apparatus after it has accomplished the cooling function.

It is, of course, apparent that the showing in the drawing of one air head under the other and the article moving on a horizontal carrier between them is merely for purposes of illustration. The article could move between two air heads opposite one another at the same level, or the entire organization of Figure 2 could be inverted. It is, of course, apparent that a very substantial amount of air will pass through the upper air head 14 and that by varying the pressure applied to the air head 15 a wide range of pressure ratios may be had.

Figure 4 shows a plot illustrating the variation of impact resistance with the variation of pressure ratio. The numerals at the left of Figure 4 represent the maximum distance a certain steel ball can fall onto the smooth side of an article, such as A, normal to the surface without breaking the article. From this figure of the drawing it will be seen that when the pressure on the opposite sides of the article is equal the impact resistance as measured by the drop test is only about one-half of what it is when the pressure ratio is approximately one-half. It is also apparent that there is a substantial range of pressure ratios wherein more pressure is applied to the prism side than to the plain side, and in which the impact resistance is improved over what it would have been had the same pressure been used on both sides. From the drawing it is also apparent that when the pressure on the smooth side is increased to quantities up to twice what is used on the prismatic side, the impact resistance is about one-half as much.

It is, of course, understood that a curve such as illustrated in Figure 4 is merely a typical curve for one article and set of pressure conditions. As articles having varying size and shape, contour and the like are treated the curves obtained will vary, but it has been found that there is a great improvement in the impact resistance when adequate air is supplied to the prism side and less air applied to the smooth side.

In the arrangement shown in Figure 3 the air heads 14 and 15, nozzles 16, 16 and pressure gauges 17 and 18 are the same, but instead of building up the pressure in one air head to a substantial degree above that in the other, here the pressure is the same and the proportionate change in cooling effect is obtained by moving the article A closer to one set of nozzles than to the other, so that more air is blown against the prismatic side.

The set up shown in Figure 5 is the same as in Figure 2, and the same reference characters are applied, except that article B of the shape shown in Patent 2,304,208 of December 8, 1942, has a lower enameled surface 20, such as, for example, a coating of black enamel. The enamel, of course, can be fired on during the time the article is passing through the furnace. Here the unenameled surface of the article is cooled by the stronger blast of air from the air head 14 wherein the pressure is higher than in air head 15, as indicated by the gauges 17 and 18.

The arrangement shown in Figure 6 is similar to the arrangement shown in Figure 3, the greater amount of air for cooling effect applied to the unenameled surface by moving the article B closer to one nozzle 16 and altering the air supply so that each air head gets the same pressure.

In either of the arrangements shown in Figures 5 and 6 greater cooling force is obtained against the unenameled side of the article.

Since it is obvious that the method may be embodied in other forms within the scope of the claims, I wish it to be understood that the particular methods shown are but a few of these forms, and various modifications and changes being possible, I do not otherwise limit myself in any way with respect thereto.

What is claimed is:

1. The process of treating a glass article whose opposite surfaces have unequal rates of heat abstraction per unit of projected area whereby one side tends to cool naturally faster than the other, which comprises heating the glass approximately to the softening point and then applying cooling medium to the opposite surfaces with substantially less proportionate amount applied to the side having said greater rate of heat abstraction.

2. The process of treating a glass article whose opposite surfaces have unequal rates of heat abstraction per unit of projected area whereby one side tends to cool naturally faster than the other, which comprises heating the glass approximately to the softening point and then blowing cold air against the opposite surfaces with the greater cooling force applied to the surface having the lesser rate of heat abstraction.

3. The process of treating a glass article wherein one side has a substantially greater surface area than the other, which comprises heating the glass approximately to the softening point and then applying cooling medium to the opposite sides with substantially less proportionate amount applied to the side having the lesser surface area.

4. The process of treating a glass article having prismatic surfaces on one face and being relatively smooth on the other face, which comprises heating the article approximately to the softening point, and then blowing cold air against the opposite surfaces with the air applied to the face having the prismatic surfaces maintaining a greater cooling force than that applied to the relatively smooth face.

5. The process of tempering or heat treating a prismatic glass article having prisms on one side thereof and a smooth surface on the opposite side, wherein the article is heated approximately to the softening point and a greater cooling force is applied to the prismatic side than to the smooth side of the article.

6. The process of treating a glass article having an enameled surface and an opposite unenameled surface, which comprises heating the article approximately to the softening point, and then blowing cold air against the opposite surfaces with the air applied to the face having the unenameled surface maintaining a greater cooling force than that applied to the enameled face.

7. The process of treating a glass article whose opposite sides have unequal rates of heat abstraction per unit of projected area whereby one side tends to cool naturally faster than the other, which comprises subjecting each side to a blast of cold air of an amount to produce tempering, and wherein the cooling force applied on the side of higher heat abstraction rate is decreased in an amount substantially proportionate to said heat abstraction rates.

SAMUEL J. HARRIS.